Dec. 5, 1961 — G. FLEISSNER — 3,011,328
APPARATUS FOR LIQUID TREATMENT OF LOOSE FIBROUS MATERIALS
Filed Oct. 21, 1958 — 5 Sheets-Sheet 1

INVENTOR
Gerold Fleissner

BY Bailey, Stephens & Huettig
ATTORNEYS

Dec. 5, 1961   G. FLEISSNER   3,011,328
APPARATUS FOR LIQUID TREATMENT OF LOOSE FIBROUS MATERIALS
Filed Oct. 21, 1958   5 Sheets-Sheet 2

INVENTOR
Gerold Fleissner

BY Bailey, Stephens & Huettig
ATTORNEYS

Dec. 5, 1961    G. FLEISSNER    3,011,328
APPARATUS FOR LIQUID TREATMENT OF LOOSE FIBROUS MATERIALS
Filed Oct. 21, 1958    5 Sheets-Sheet 3

INVENTOR
Gerold Fleissner

BY Bailey, Stephens & Huettig
ATTORNEYS

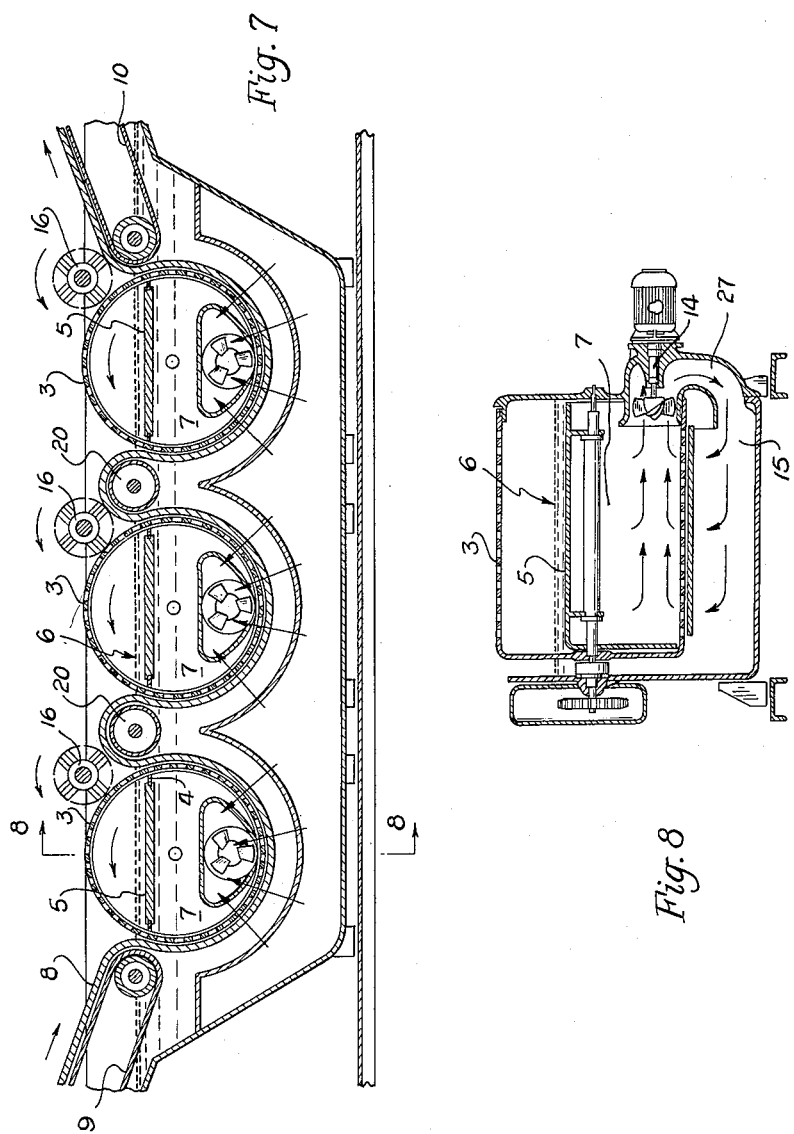

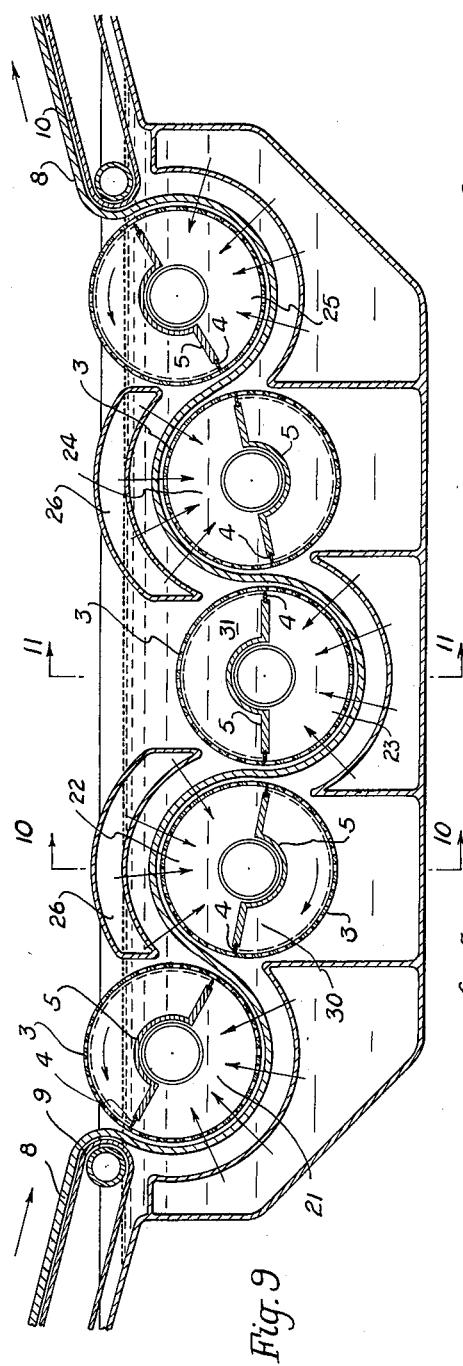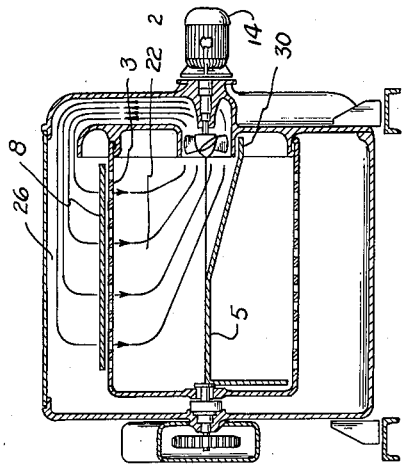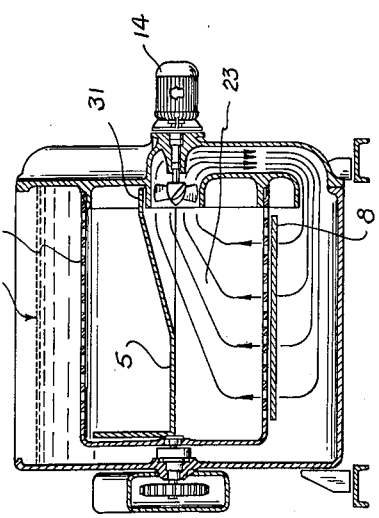

United States Patent Office 3,011,328
Patented Dec. 5, 1961

3,011,328
APPARATUS FOR LIQUID TREATMENT OF LOOSE FIBROUS MATERIALS
Gerold Fleissner, Egelsbach, Germany, assignor to Firma Fleissner G.m.b.H., Egelsbach, Germany
Filed Oct. 21, 1958, Ser. No. 768,689
Claims priority, application Germany Oct. 29, 1957
8 Claims. (Cl. 68—158)

The present invention relates to an apparatus for treating loose fibrous materials, slivers, skein yarn, or the like by means of liquids, for example, for washing and dyeing the same.

An apparatus of this type known prior to this invention consists of one or more drums, each of which has a cylindrical perforated wall and is rotatable about a horizontal axis while partly or entirely immersed into the liquid. The fibrous material is held on the perforated drum solely by a strong suction which is produced at the inside of the drum by a pump and draws the liquid through the layer of material, thereby soaking the same thoroughly in the liquid. In one known design of this apparatus in which the drums are partly immersed in the liquid, they are open at their upper sides so that the suction will draw the liquid not only through the fibrous material on the drums, but also through the perforated drum surface which is not covered by the material. The flow of liquid produced by the suction within the drums will therefore take the course of least resistance and occur more easily through the perforated drum surface which is not covered by the material rather than through the material itself with the result that there will be very little, if any, passage of liquid through the material on the drums.

It is an object of the present invention to provide an apparatus of the type as above described which, however, fully avoids the above-mentioned disadvantage by concentrating the flow of treating liquid so as to pass solely through the fibrous material into the drums. This object of the invention is attained by providing each perforated suction drum with a stationary partition which separates the inside of the drum into two chambers which are thus substantially sealed from each other. The size of these chambers and the dimensions of the partitions therein depend upon the extent of the convolution of the layer or bat of fibrous material or the like on the perforated drum surface. The peripheral arcuate wall portion of the drum which during its rotation is in engagement with the fibrous material which is to be treated by the liquid then forms the outer wall portion of one of these chambers, while the remainder of the outer peripheral wall of the drum which is substantially free of the material to be treated forms the outer wall portion of the other chamber. The first-mentioned drum chamber is then connected to a strong suction pump which draws the treating liquid from its container, in which the drum is partly or entirely immersed, solely through the layer of fibrous material into and through this drum chamber, while the liquid covering either partly or entirely the outer wall of the other chamber which is substantially free of fibrous material and located at the other side of the partition is not connected to the pump. The suction of the pump is therefore concentrated solely upon that part of the drum which is covered with the layer of fibrous material, and it thus sucks only that part of the liquid from the container which passes through the fibrous material.

Aside from the fact that the suction of the pump is thus not wasted, but used solely for the circulation of the treating liquid through the fibrous material, the present invention permits a considerable reduction in the amount of liquid required for the respective treatment. This is especially of importance if such treatment concerns the dyeing of fibrous material with expensive dyes. It will thus be evident that the present invention renders the entire operation of an apparatus of the type described much more economical and the treatment therein much more effective than was previously possible when similar apparatus were used.

Further objects, features, and advantages of the present invention will appear from the following detailed description thereof, particularly when read with reference to the accompanying diagrammatic drawings, in which—

FIGURE 7 shows a vertical cross section of an apparatus similar to that shown in FIGURE 5, but provided with a series of three perforated drums side-by-side;

FIGURE 8 shows a cross section taken at line 8—8 of FIGURE 7;

FIGURE 9 shows a vertical cross section of still another modification of the apparatus according to the invention which is provided with a series of five perforated drums which are side-by-side;

FIGURE 10 shows a cross section taken at line 10—10 of FIGURE 9; while

FIGURE 11 shows a cross section taken at line 11—11 of FIGURE 9.

Figure 1:
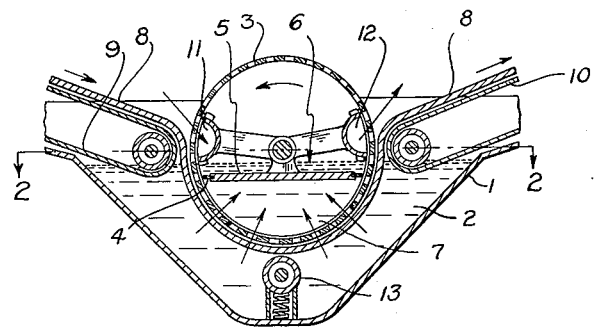
FIGURE 1 shows a vertical cross section of an apparatus according to the invention which is intended, for example, for washing or dyeing a loose fibrous material.
Figure 1A:
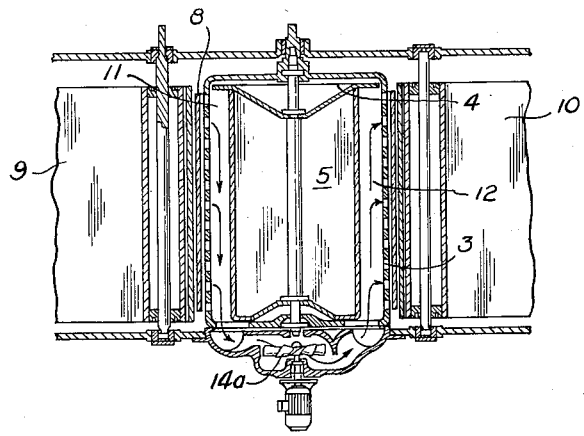
FIGURE 1a is a cross-sectional view taken on the line 2—2 of FIGURE 1.
Figure 2:
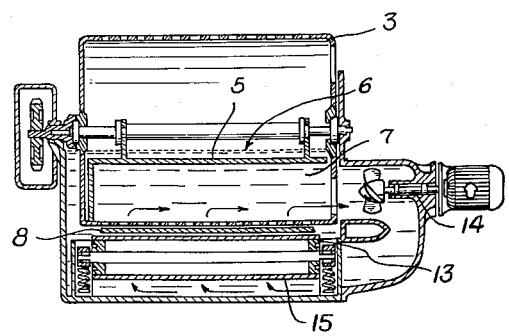
FIGURE 2 shows a central vertical cross section taken at right angles to FIGURE 1.

Referring to the drawings, and first particularly to FIGURES 1 and 2, the apparatus according to the invention essentially consists of a container 1 for holding a treating liquid 2 in which a drum 3 with a perforated sievelike cylindrical wall is rotatably mounted and adapted to be constantly driven by a motor, not shown. Drum 3 contains a partition 5 with sealing elements 4 at its outer ends engaging the inner surface of drum 3. This partition 5 is mounted in a stationary position within drum 3 and thus separates the interior of the drum into two separate chambers, the lower chamber 7 of which is connected at one end to a strong suction pump 14 while the upper chamber contains at opposite sides thereof and closely above the liquid level 6 a pair of channels 11 and 12, one of which, 11, is connected to the suction side of a blower 14a, while the other channel 12 is connected to the blowing side of either the same or another blower. A bat 8 of loose fibrous material or the like which is to be treated by the liquid 2 in container 1 is fed toward drum 3 above the liquid level 6 by means of a conveyer belt 9. As soon as bat 8 reaches the outer surface of drum 3 and immediately before entering into the bath of liquid 2, it passes in front of the stationary suction channel 11 and will be subjected through the apertures in the drum wall to a strong air suction and thus be drawn firmly against the wall so as to be carried more securely into liquid 2. As soon as bat 8 passes into the liquid, it will then be subjected to the suction prevailing in chamber 7 and will thus be held on the perforated drum surface until it again reaches the surface of the liquid at the other side of the drum, where it will pass in front of the stationary blow channel 12 so that it will now be blown off the drum surface and against the surface of a second conveyer belt 10 which may then carry the bat to a place for further treatment.

From the above it will be evident that, due to the stationary partition 5 with its sealing elements 4, the liquid 2 will be drawn from container 1 solely through those parts of bat 8 which are held on the drum surface by the suction of pump 14. Thus, even though the liquid level 6 should be higher than shown in FIGURE 1, the flow of liquid will only occur through the parts of bat 8 and drum 3 below partition 5. It may also be seen from FIGURE 1 that the container 1 may be relatively small and shallow so that only a relatively small quantity of liquid 2 will be required for carrying out the respective treatment of the bat of loose fibrous material or the like. Such treatment, especially for washing or dyeing the fibrous material may be rendered still more effective by the provision of one or more squeezing rollers 13 below the liquid level 6 in container 1.

FIGURE 2 further indicates by arrows the direction of the flow of the treating liquid which is drawn by pump 14 from chamber 7, which is separated from the upper part of the drum by partition 5, whereupon the liquid is returned into container 1 through the outlet channel 15.

Figure 3:
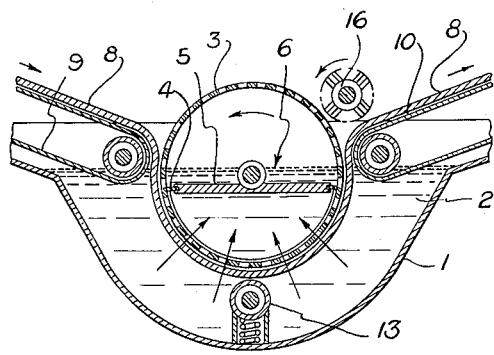
FIGURE 3 shows a vertical cross section of a modification of the apparatus according to FIGURE 1.
Figure 4:
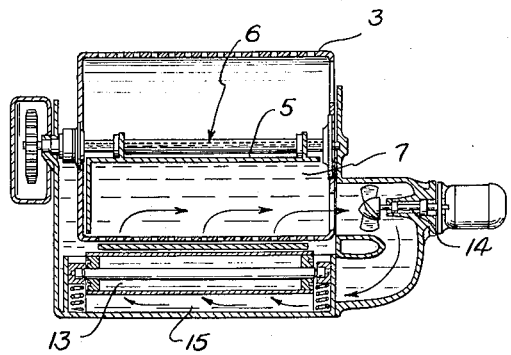
FIGURE 4 shows a central vertical cross section taken at right angles to FIGURE 3.

The embodiments of the invention shown in FIGURES 3 to 6 differ from that according to FIGURES 1 and 2 primarily by the greater depth to which the perforated drum 3 is immersed into the liquid 2 and thus by the greater dimensions of the suction chamber 7, further by the fact that the fiber bat 8 passes directly into the treating liquid 2 without being first drawn by air suction against the drum surface, and finally by the fact that, instead of being stripped off the drum surface by an air blast, the fiber bat is removed from the drum and transferred to the conveyer belt 10 by a rotating stripping roller 16 which is driven in the direction as indicated in FIGURE 3 by an arrow.

Figure 5:
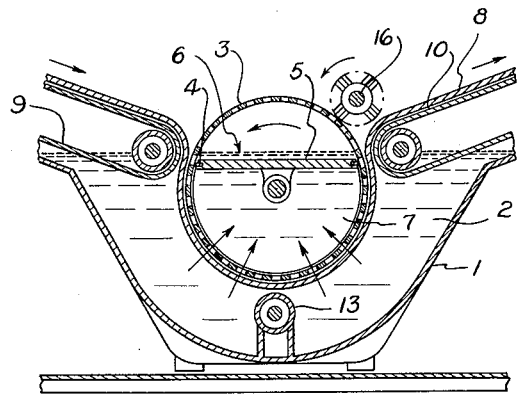
FIGURE 5 shows a vertical cross section of another modification of the apparatus according to FIGURE 1.
Figure 6:
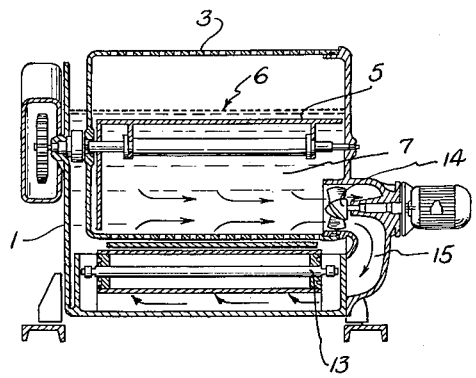
FIGURE 6 shows a central vertical cross section taken at right angles to FIGURE 5.

FIGURE 7 illustrates a further embodiment of the invention consisting of three perforated drums 3, each unit of which is similar to the single drum unit shown in FIGURE 5. These three drum units are mounted adjacent to or behind each other and are separated by transferring rollers 20 which are partly immersed in the liquid and partly extend above the liquid level 6. A channel 27 at one side of the container directs the liquid under the pressure of the pumps 14 for each chamber 7 back into the area underneath the drums.

Finally, in the embodiment of the invention shown in FIGURES 9 to 11, there are five perforated drums 3 arranged directly side-by-side or adjacent each other within a bath of a suitable treating liquid so that the bat 8 of fibrous material or the like will wind alternately around the lower or upper sides of the adjacent drums. The pumps 14 of the individual drum units are therefore alternately connected to the lower or upper chambers 21 to 25, which are formed by the partitions 5 in drums 3 so that the liquid is first drawn from below into chamber 21 of the first drum, then from above into chamber 22 of the second drum, then again from below into chamber 23 of the third drum, and so forth. Since the strong suction from chambers 22 and 24 might suck the liquid level above these chambers to a point where it might no longer fully cover them, the invention further provides a channel 26 over each of these drums. As illustrated in FIGURE 10, the liquid which is withdrawn through the bat of fibrous material on the drums containing chambers 22 and 24 is then drawn through these chambers by pumps 14 and is then pumped through channels 26 back toward the bat on these drums. The effect of the suction from chambers 22 and 24 upon the liquid level above these drums will thus be fully compensated, and the layer of fibrous material on these drums will always be adequately covered with liquid so that a continuous flow thereof will pass through the material at all points which are in engagement with these drums. A lower or upper partition 30 or 31, respectively, at one side of each drum directs the liquid under the pressure from the pump 14 which is associated with the respective suction chambers 21, 22, 23, 24, or 25 either to the area of the container underneath the drums or to one or the other of channels 26 above chambers 22 and 24.

The apparatus according to FIGURES 9 to 11 has the particular advantage that, by being transferred directly from one drum 3 to the next and by being subjected to a treatment by the liquid on each drum, the fibrous material will be treated repeatedly within a container of a very short length and by means of a relatively small quantity of treating liquid. For this purpose it is also advisable to mount the drums in the liquid container in an arcuate arrangement relative to each other, as illustrated in FIGURE 9.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed my invention, what I claim is:

1. An apparatus for a liquid treatment of loose fibrous materials or the like, comprising a container for holding a treating liquid, at least one drum rotatably mounted within said container about a horizontal axis and having a perforated cylindrical outer wall, means for rotating said drum, a horizontal stationary partition chordally mounted within said drum and separating the interior of said drum into two chambers, said partition being positioned immediately beneath the surface of the liquid held in said container, sealing means for sealing said partition relative to the inner surface of said outer drum wall, the rotatable curved outer drum wall portion defining one of said chambers adapted to support a layer of loose fibrous material or the like conveyed thereon through said treating liquid in said container, and a suction pump connected to said last chamber so that the latter forms a suction chamber for drawing said liquid from said container solely through the material on said rotatable wall portion into said suction chamber and for holding said material on said wall portion by the suction produced by said pump within said suction chamber.

2. An apparatus as defined in claim 1, further comprising means within the other chamber in said drum for exerting an air suction through the perforated wall of said drum upon the fibrous material before the latter enters into said liquid in said container.

3. An apparatus as defined in claim 1, further comprising means within the other chamber in said drum for exerting an air pressure through the perforated wall of said drum upon the fibrous material for removing the same from said drum after emerging from said liquid in said container.

4. An apparatus as defined in claim 1, further comprising means for conveying said fibrous material toward said drum from one side thereof, and means for conveying said material away from said drum at the opposite side thereof, means within the other chamber in said drum for exerting an air suction through the perforated wall of said drum upon the fibrous material for taking the same off said first conveying means and drawing it toward said drum before said material enters into said liquid in said container, and means also within said other chamber for exerting an air pressure through said perforated drum wall upon the fibrous material for removing the same from said drum after emerging from said liquid in said container and for applying said material upon said second conveying means.

5. An apparatus as defined in claim 1, further comprising a plurality of said drums parallel to and mounted adjacent each other, and a transfer roller intermediate the adjacent drums and each partly extending into said liquid and partly above said liquid, said material winding successively around said wall portion defining said suction chamber of one drum, then around the part of one of said transfer rollers substantially above said liquid, and then around the wall portion defining the suction chamber of the next drum.

6. An apparatus as defined in claim 1, further comprising a plurality of said drums parallel to and mounted adjacent each other, said material winding successively along the lower side of one drum and the upper side of the next drum, each of said upper and lower sides, respectively, covered by said material defining one of said suction chambers.

7. An apparatus as defined in claim 6, wherein said suction chamber in each of said drums is connected to a suction pump, and conduit means connected to the pressure side of said suction pump and alternately to an area below one drum and the material on the wall portion thereof defining the suction chamber therein and to an area above the next drum and the material on the wall portion thereof defining the suction chamber therein for returning the liquid drawn through the material on the respective drum wall portion and the suction chamber therein to said respective area.

8. An apparatus as defined in claim 6, wherein said suction chamber in each of said drums is connected to a separate suction pump, and conduit means connected to the pressure side of each of said pumps and alternately to an area below one drum and the material on the wall portion thereof defining the suction chamber therein and to an area above the wall portion thereof defining the suction chamber therein for returning the liquid drawn through the material on the respective drum wall portion and the suction chamber therein to said respective area.

References Cited in the file of this patent

UNITED STATES PATENTS

| | | |
|---|---|---|
| 1,432,319 | Brandwood | Oct. 17, 1922 |
| 1,483,060 | Farrell | Feb. 5, 1924 |
| 1,794,403 | Hanhart | Mar. 3, 1931 |
| 2,080,635 | Schramek | May 18, 1937 |
| 2,494,807 | Haeberlin | Jan. 17, 1950 |

FOREIGN PATENTS

| | | |
|---|---|---|
| 77,037 | Netherlands | Jan. 15, 1955 |
| 547,779 | Belgium | May 31, 1956 |